July 3, 1934.    M. H. HILL    1,964,800
METHOD OF AND MACHINE FOR CUTTING GEARS
Filed Aug. 29, 1930    3 Sheets-Sheet 1

INVENTOR
Maxwell H. Hill
BY
his ATTORNEY

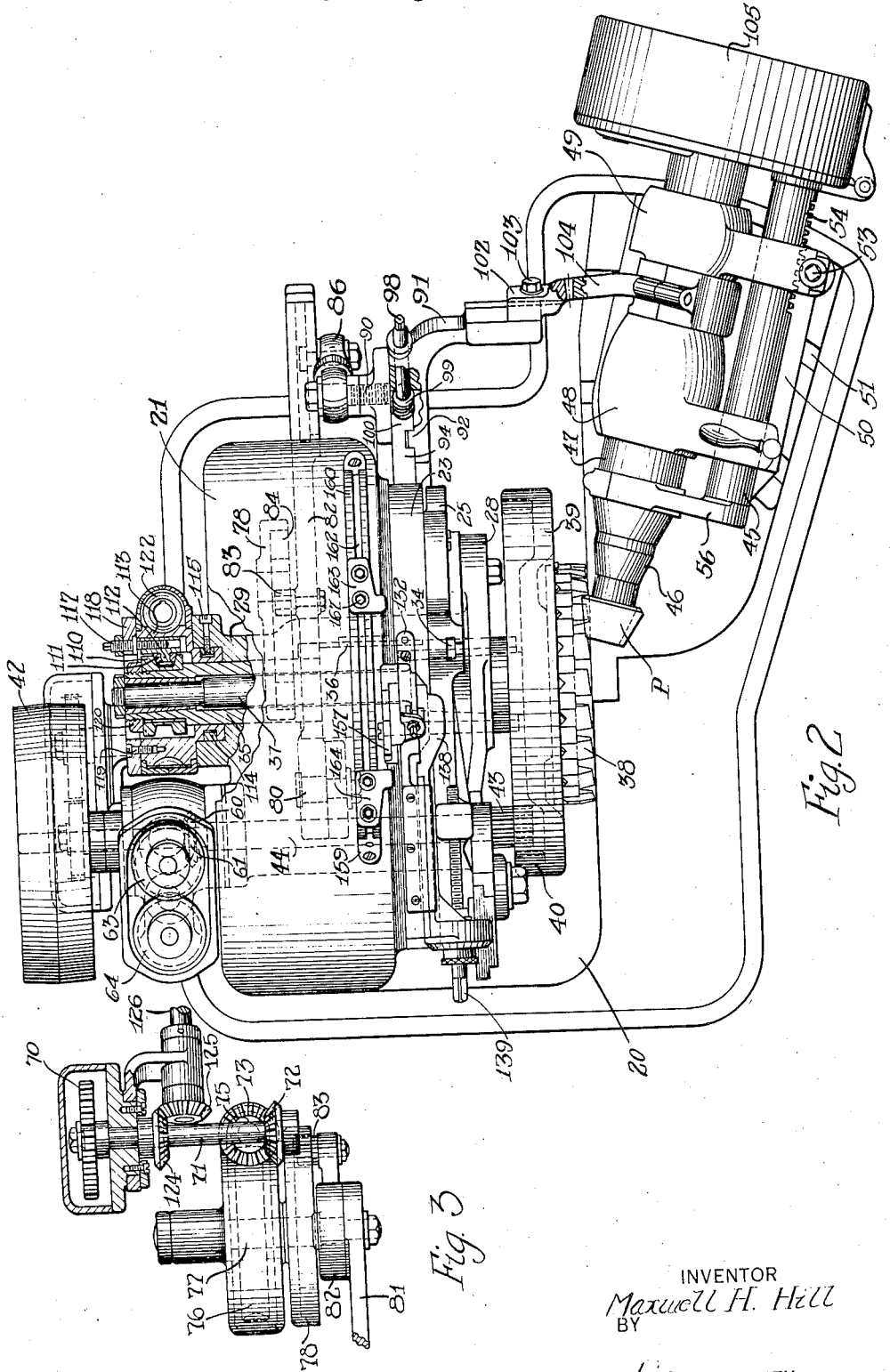

July 3, 1934.   M. H. HILL   1,964,800
METHOD OF AND MACHINE FOR CUTTING GEARS
Filed Aug. 29, 1930   3 Sheets-Sheet 3
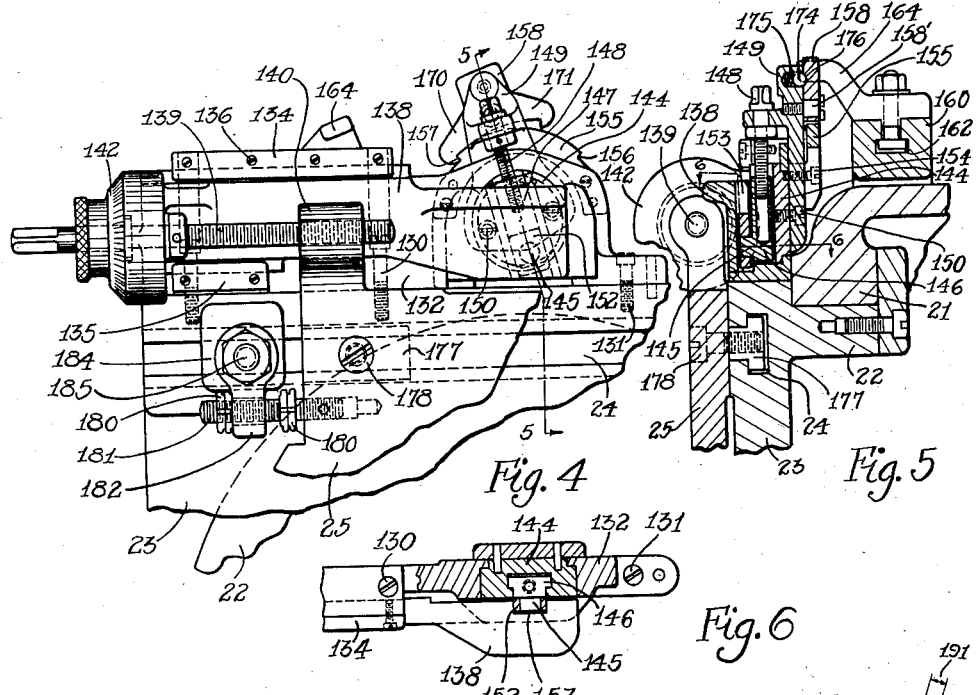
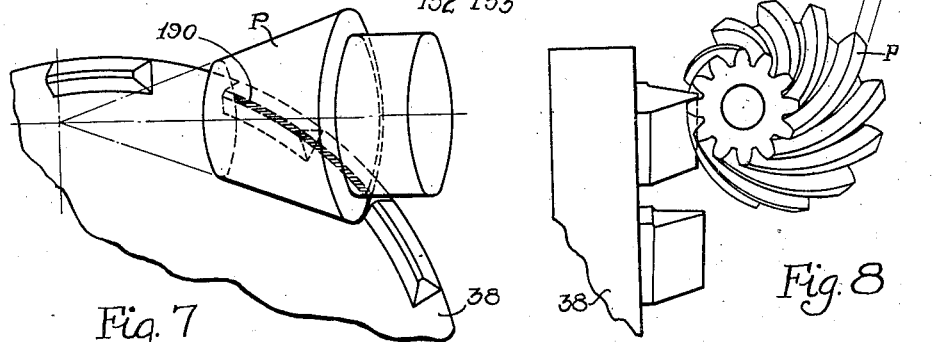
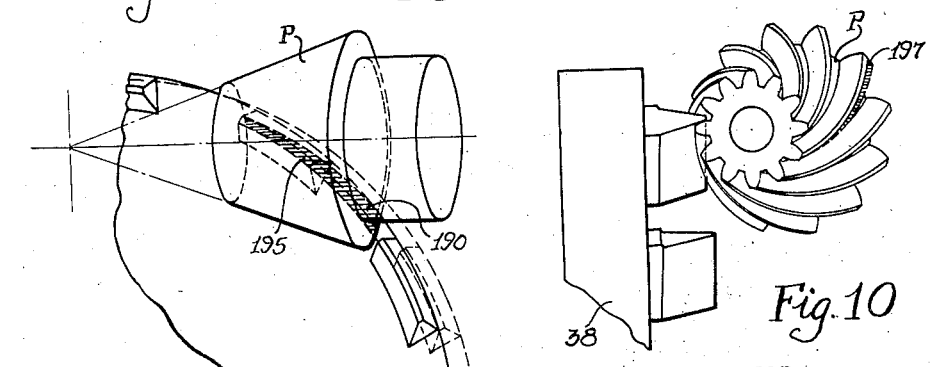
INVENTOR
Maxwell H. Hill
BY
his ATTORNEY Patented July 3, 1934

1,964,800

UNITED STATES PATENT OFFICE 1,964,800

METHOD OF AND MACHINE FOR CUTTING GEARS

Maxwell H. Hill, Rochester, N. Y., assignor to Gleason Works, Rochester, N. Y., a corporation of New York Application August 29, 1930, Serial No. 478,630

13 Claims. (Cl. 90—4)

The present invention relates to the cutting of gears and particularly of longtiudinally curved tooth gears. In a more particular aspect, this invention relates to the cutting of longitudinally curved tooth bevel and hypoid pinions.

The present invention has for its primary purpose to provide a method and a machine for roughing longitudinally curved tooth bevel and hypoid pinions which will permit roughing these pinions so that the roughed blank will have slots tapering in width from one end to the other like the tooth spaces of the finished pinion, whereby a minimum of stock will be left on the teeth of the roughed pinion to be removed in the finishing operation.

In the methods heretofore employed in roughing out longitudinally curved tooth pinions, each tooth slot has been cut with the tool set in one position by feeding the tool into the slot to the depth desired. As a result of this method of roughing, the two sides of the teeth bounding a tooth slot are curved longitudinally in the roughed blank about the same center and the bottom of the tooth slot is of uniform width throughout its length. There is a decided disadvantage to this prior method of roughing for the finished pinion must ordinarily have the side tooth faces bounding each tooth space curved longitudinally about different centers with the result that the bottom of the finished tooth spaces will, accordingly, taper in width from end to end. The prior roughing method leaves a considerable amount of stock on the teeth of the roughed pinion which has to be removed in the finishing operation. This increases the time required to finish-cut a pinion, puts a heavy burden on the finishing cutter and at times affects the finish of the tooth surfaces.

With the present invention, the two sides bounding a tooth space are roughed from different centers. This is accomplished by shifting the cutter, after it has reached full depth position and completed one tooth side, to change the position of its center and continuing the cutting operation in the same tooth slot until the other side of the tooth slot has been roughed out from the new center. Due to the change in position of the cutter which takes place during the roughing of each slot of the blank, each tooth space of a pinion roughed according to the present invention will be of tapering width from end to end and a uniform amount of stock will be left on the roughed teeth to be removed in the final finishing operation.

The present invention may be considered an improvement over the invention of the co-pending joint application of the present inventor and Magnus H. Johanson, Serial No. 478,344, filed August 28, 1930. In that application both the cutter and the blank are shifted in order to get the desired lengthwise taper in width of the tooth slot in the roughed blank. In the method and machine of the present invention, only the cutter is shifted but the same result is secured by reason of the fact that this shift of the cutter is in a direction substantially parallel to the direction of the tooth slot at the small end thereof. Like the invention of the pending application mentioned, the present invention constitutes an improvement over the invention of Patent No. 1,385,200, issued July 19, 1921 to E. W. Bullock et al., for with the present invention, just as with the invention of the pending application mentioned, pinions having grooves of the desired lengthwise tapering width can be cut.

In production work, the larger member of a pair of longitudinally curved tooth bevel or hypoid gears is ordinarily finish-cut "spread-blade", that is, both sides of a tooth space are ordinarily finish-cut simultaneously from the same center. There are cases, however, where these gears are finish-cut one side at a time. In these cases, the present invention can be used to advantage for roughing the larger member of the pair, also, and this member may be roughed either with or without a generating roll.

The process of the present invention is not confined however, to roughing. It can be used for finish-cutting, also, and has the advantage that it permits of finish-cutting either a gear or a pinion so that the two sides bounding a tooth slot are cut from different centers in a single continuous operation with a single manual setting of the tool. As a finishing process, then, it eliminates some of the loss of time required at present in manually changing the set-up after finishing one side of a tooth to permit finishing the other side of the tooth. Thus, the present invention makes it possible to produce a finished gear or pinion having teeth of properly tapering width lengthwise in shorter time than is possible with present finishing practice.

The process of the present invention and an improved type of gear cutting machine for carrying out the process are illustrated in the accompanying drawings, in which:

Figure 2 is a plan view of this machine, parts being broken away;

Figure 3 is a view showing details of the drive of the machine, this view being taken more or less generally along the line 3—3 of Figure 1, looking in the direction of the arrows;

Figure 4 is an enlarged detail view showing the mechanism for shifting the tool slide;

Figure 5 is a section on the line 5—5 of Figure 4;

Figure 6 is a fragmentary view taken substantially on the line 6—6 of Figure 5;

Figure 1:
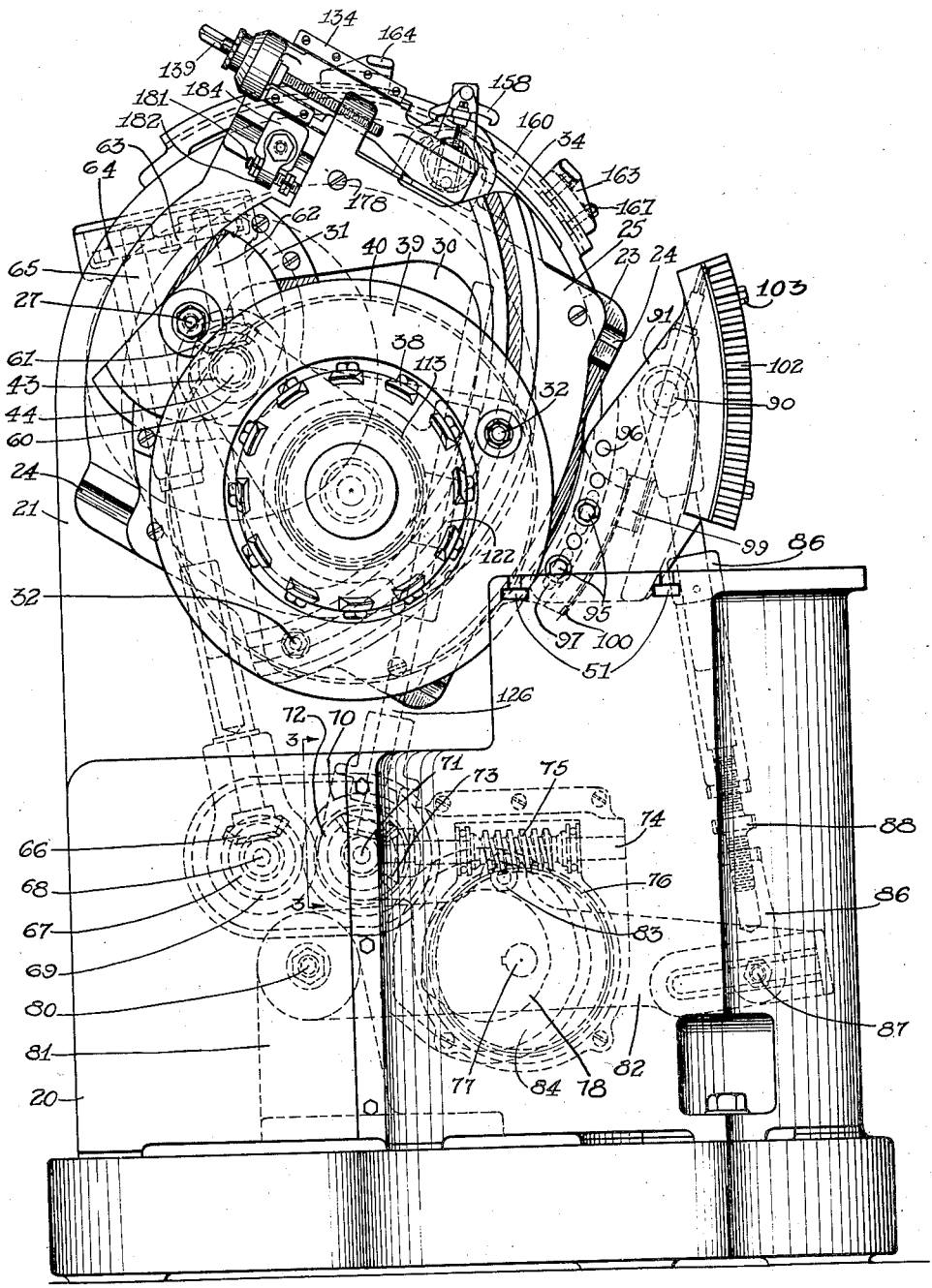
Figure 1 is a side elevation, with the work head removed, of a machine constructed according to this invention for roughing or finish-cutting spiral bevel or hypoid pinions.

Figure 7 is a fragmentary side elevation and Figure 8 a fragmentary end elevation, showing the first position of the tool and blank in roughing a spiral bevel pinion according to the present invention; and Figures 9 and 10 are a fragmentary side elevation and a fragmentary end view, respectively, showing the relative positions of the cutter and blank after the cutter has been shifted and showing how with the present invention a groove of properly tapering width from end to end is cut into the blank.

In the machine illustrated in the drawings, the cutter rotates continuously on its axis. It is first fed into the blank and then the tool and blank are rolled together in one direction. When the roll in one direction has been completed, the cutter slide is released and the cutter shifted so that its center is moved in a direction substantially parallel to the direction of the tooth space at its small end. The cutter slide is then reclamped to the cradle and the work and cutter roll together in the opposite direction. During this return portion of the roll, the cutter cuts in the same tooth space but from a new center, thus producing a tooth space which tapers in width from the small end outwardly. At the end of the return roll, the cutter is withdrawn out of the tooth space, the blank is indexed and the cutter is returned to initial position. The cycle then begins anew.

With this brief description of the operation of the machine, reference may now be had to the drawings for a more detailed description thereof and for a more complete understanding of the invention.

20 designates the base or frame of the machine. Journaled in a circular bearing in the bearing-portion 21 of the frame is an oscillatory cradle 22.

The cradle 22 is formed at its front end with a face-plate 23 which is provided with a pair of parallel T-slots 24. Mounted on the face-plate for adjustment and sliding movement thereon is a plate or slide 25. Mounted on the plate or slide 25 for angular adjustment thereon about the axis of a bolt 27 which is arranged eccentrically to the axis of the cradle, is a cutter support 28. This cutter support is formed with a suitable bearing portion 29 (Fig. 2) which extends through an opening 30 in the plate 25 and into the hollow central portion of the cradle 22. The cutter support 28 can be adjusted accurately to any desired angular position on the plate 25 by means of the graduations 31 formed on the plate 25 which read against a zero mark on the support 28 and the support 28 can be clamped in any adjusted position on the plate 25 by means of the T-bolts 32, the heads of which engage in the T-slot 34 formed in the plate or slide 25. This slot 34 is curved about the axis of the bolt 27.

Journaled in a sleeve 35 (Fig. 2) that is slidably mounted in the bearing portion 29 of the cutter support 28 is a cutter spindle 37. This sleeve 35 is restrained from turning in the bearing portion 29 by a key and keyway designated at 36 (Fig. 2). The face mill cutter 38 which is employed as the cutting tool is secured by any suitable means to the cutter spindle 37 to rotate therewith. The cutter 38 may be of the usual type in which case alternate blades will have outside and inside cutting edges or it may be constructed so that each of the blades is formed with both an outside and an inside cutting edge.

The cutter head is secured to a shroud 39 which, in turn, is secured to an internal gear 40.

By adjusting the slide 25 on the face of the cradle and adjusting the support 28 on the plate 25, the cutter 38 can be adjusted to the correct position with reference to the axis of the cradle to cut a gear of any desired spiral angle.

The cutter is rotated continuously during the operation of the machine, being driven from the pulley 42 by means of the pinion 43 which is secured to the pulley shaft 44 and which meshes with the internal gear 40.

The pinion blank P to be cut is secured in any usual or suitable manner to the work spindle 46 of the machine. The work spindle 46 is mounted in a sleeve 47 and is rotatable therein. The sleeve 47 is journaled in suitable bearings 48 and 49 formed on the work head 50. The work head 50 is adjustable angularly on the frame 20 to permit adjusting the blank into the correct cutting plane and can be secured in any adjusted position by means of T-bolts (not shown) which engage in the T-slots 51 formed in the frame 20. The work spindle 46 and sleeve 47 are slidable adjustable in the bearings 48 and 49 to secure the proper cone apex position of the pinion blank. This last named adjustment is effected by rotation of a stud-shaft 53 which carries a pinion (not shown) that meshes with a rack 54 cut into a bar 55 which is connected by means of the collar 56 to the sleeve 47.

The parts described so far are substantially identical in construction to like parts of the machine of Patent No. 1,385,200 above referred to and reference may be had to that patent for a more complete description thereof. Indeed, the drives to the cradle and to the work spindle and to the feed cam employed in the machine of the present drawings are, with the exception of certain design changes, substantially the same as like drives of the machine of this patent. These drives of the present machine will now be described.

Fastened to the pulley shaft 44 at a point intermediate its ends is a miter gear 60 which meshes with and drives a miter gear 61 (Figs. 1 and 2) which is secured to a shaft 62 suitably journaled in a bracket secured to the base or frame of the machine. The shaft 62 carries a spur gear 63 that meshes with and drives a spur gear 64 on a telescoping shaft 65. The shaft 65 carries at its lower end a miter gear 66 that meshes with and drives a miter gear 67 which is secured to a shaft 68. The shaft 68 carries a spur gear 69 that meshes with and drives a spur gear 70 (Figs. 1 and 3) on a shaft 71. The shaft 71 carries a miter gear 72 that meshes with and drives a miter gear 73 on a worm shaft 74. The worm shaft 74 carries a worm 75 that meshes with and drives a worm-wheel 76. The worm-wheel 76 is secured to a shaft 77 which carries a cam 78.

Pivotally mounted at 80 on a bracket 81 secured to the base or frame of the machine is a lever arm 82. This arm 82 carries intermediate its ends a roller 83 which engages in the trackway 84 of the cam 78, causing the arm 82 to oscillate as the cam 78 rotates. A connecting rod 86 is connected with the arm 82 at its free end by means of a bolt 87 and the usual block and slot connection. This connecting rod 86 is made in two parts adjustably connected together by a turnbuckle 88.

At its upper end, the connecting rod 86 is pivotally connected by means of the stud 90 with a bracket 91 that is adjustably connected with the face-plate 23 of the cradle. The bracket 91 is provided with an arcuate tongue 92 which engages in an arcuate groove formed in an extension 94 of the face-plate 23.

The tongue 92 and the groove in which it fits are curved about the axis of the cradle as a center. The bracket 91 can be secured in any adjusted position on the face-plate 23 by means of bolts 95 which can be passed through any of the holes 96 in the bracket 91 and which pass through the arcuate slots 97 in the face-plate 23. The bracket 91 can be adjusted with reference to the face-plate 23 by rotating the shaft 98. This shaft is journaled in the bracket 91 and carries a worm 99 that engages a worm-wheel segment 100 which is formed on the periphery of the extension 94 of the face-plate 23.

The bracket 91 carries a crown gear segment 102 which is adjustable on the bracket 91 in a direction axial of the cradle and which can be secured in any adjusted position by the bolts 103. This crown gear segment 102 meshes with a bevel gear segment 104 which is secured in any suitable manner to the sleeve 47.

During cutting, the sleeve 47 and work spindle 46 are connected together so that as the cradle oscillates under actuation of the cam 78 and connecting rod 86, an oscillatory movement is simultaneously imparted to the sleeve 47 and work spindle 46 by means of the crown gear segment 102 and the gear segment 104. The guard 105 encloses the index mechanism which may be of the type described in Patent No. 1,385,200 above mentioned or of any other suitable type and which operates to connect the sleeve and work spindle for rotation together during cutting and to disconnect the sleeve from the work spindle at a predetermined point in the roll of the cradle to permit relative movement between the two for indexing.

There is a dwell in the cam 78 and while the roller 83 is in engagement with this portion of the cam trackway before the actual cradle roll begins, the cutter is fed into depth and it remains in full depth until the tooth slot has been completely roughed when it is withdrawn to permit of indexing the blank. The mechanism for feeding and withdrawing the cutter will now be described. This mechanism includes a cam 110 which is keyed to the sleeve 35 in which the cutter spindle 37 is journaled (Fig. 2). The trackway of this cam 110 engages a follower or roller 111 that is mounted on a block 112 which is axially adjustable in a groove cut in the internal periphery of a worm-wheel 113. This worm-wheel 113 is rotatably mounted in the cutter support 29 and surrounds the cam 110. It is held against axial movement by the ring 114 and the set-screw 115. The block 112 is adjustable axially with reference to the worm-wheel 113 by means of a screw 117 that threads into the cover-plate 118 which is secured to the worm-wheel 113 by screws 119 and which serves as an end-plate for the cutter support. The cam 110 is secured to the sleeve 35 by the nut 120 which threads onto this sleeve.

The worm-wheel 113 is rotated to rotate the follower 111 and impart axial movement to the cam 110, sleeve 35 and cutter spindle 37 by a worm 122. This worm 122 is driven from the shaft 71 (Figs. 1 and 3) through the miter gears 124 and 125 and the angular shaft 126 to which the worm is secured.

At opposite ends of the roll of the cradle, the cutter slide 25 is shifted to shift the cutter. At one end of the roll this shifting movement moves the cutter from its position of initial adjustment so that the cutter will cut from a different center on the return roll and at the other end of the roll, this shifting movement shifts the cutter back to initial position ready for operation on the next tooth slot. The mechanism for effecting the shifting movements of the cutter slide 25 will now be described.

Secured to the top of the face-plate 23 of the cradle by means of screws 130 and 131 (Figs. 4 to 6 inclusive) is a bracket 132. Plates or gibs 134 and 135 are secured to this bracket 132 by screws 136. These gibs 134 and 135 extend for a portion only of the length of the bracket 132 and co-operate with the bracket to form a guideway in which the arm 138 slides. This arm 138 is adjustably connected by means of the screw 139 and lug 140 with the tool slide 25 so that when the tool slide 25 has been adjusted relative to the arm 138, the two will move together. A graduated dial 142 is provided to enable the adjustment of the tool slide 25 relative to the arm 138 to be made accurately as is required in setting the cutter to the correct spiral angle.

The arm 138 is reciprocated by a crank 144. The crank-pin 145 of the crank 144 is carried on a block 146 that is adjustable in a groove 147 formed in the face of the crank-plate by means of a screw 148. The screw 148 is mounted in an arm 149 which is secured to the crank plate 144 by the screws 150. The motion of the crank plate is transmitted to the arm 138 from the crank-pin 145 by a block 152 which is pivotally mounted on the crank-pin and which engages in a slot 153 formed in the rear face of the arm 138.

Secured to the back of the bracket 132 by means of screws 154 is an arcuate member 155 which is formed on its periphery to provide shoulders at 156 and 157. Pivotally mounted on the arm 149 is a double-armed keeper 158. The stud 158' which threads into the rear of the arm 149 serves as a pivot for this keeper. The arms of the keeper are adapted to engage alternately with the shoulders 156 and 157 of the arcuate strap 155 to secure the crank 144 and the slide 25 against movement during cutting.

Secured to the bearing-portion 21 of the frame of the machine by screws 159 is an arcuate pad 160 (Figs. 1, 2 and 5). This pad 160 is formed with a T-slot 162. A pair of stop lugs 163 and 164 are adjustably mounted on the pad 160 and may be clamped in any adjusted position thereon by the T-bolts 167 whose heads engage in the T-slot 162.

It will be understood that when one of the arms of the keeper is engaged with one of the shoulders 156 or 157 of the arcuate plate 155, the slide 25 will be held in position on the face-plate 23 of the cradle for movement with the cradle. Assuming the parts to be in the position shown in Figures 1 and 4, and the cradle to be moving in a counter-clockwise direction, it will be seen that the keeper 158 will be brought into contact with the stop 164 and that the keeper will be rocked about the pivot stud 158' disengaging the arm 170 of the keeper from the shoulder 157 of the strap 155. This will release the arm 138 and slide 25, free to be moved on the face-plate 23. When the keeper has been rocked far enough that its arm 171 contacts the periphery of the plate 155, its rotary movement will be temporarily arrested and then the continued movement of the cradle will cause the arm 149 to be rocked by the stop 164. Thus, the crank-plate 144 is rocked, shifting the slide 138 to the right from the position shown in Figures 1 and 4 and with it the slide 25 and the cutter 38 mounted thereon.

The amount of movement of the arm 138 and the slide 25 is determined by the adjustment of the crank-pin 145. If the crank-pin were on center, no movement would occur. The block 146 is graduated to read against a zero mark on the face of the crank-plate so that the adjustment of throw of the crank can be made very accurately.

The stops 164 and 168 are so adjusted on the strap 160 that at the ends of the cradle roll the crank-arm 149 will have moved far enough to carry the keeper clear of the peripheral portion of the strap 155 between the shoulders 156 and 157 and the last part of the cradle movement before reversal will again rotate the keeper about the stud 158' to engage the arm 170 or 171, as the case may be, with the shoulder 157 or 156, respectively, reconnecting the bracket 132 and slide 25 to the cradle. The keeper 158 has two spaced notches 176 in its front face, one of which is shown in Fig. 5. The keeper is resiliently held at either limit of its movement with one or the other arm 170 or 171 engaged with the shoulder 157 or the shoulder 156, respectively, of the strap 155 by the ball detent 174 which is snapped by the spring 175 into engagement with one or other of the notches 176 in the face of the keeper.

To take the weight of the slide 25 and the cutter mounted thereon off of the arm 138, and hold the slide in working contact with the cradle, four blocks 177 are provided. Only one of these is shown in the drawings. These blocks travel in the T-slots 24 of the face-plate, acting as guides for the slide 25 in its movement. These blocks are, respectively, secured to the slide 25 by screws 178.

Adjustable stops are provided to limit the movement of the slide 25. These take the form of nuts 180 which are threaded on the screw 181 that threads into the slide 25. These nuts are adjusted so as to allow of only the desired amount of movement of the slide under actuation of the crank 144 and are adapted to engage a lug 182 to limit the movement of the slide 25 in both directions. The screw 181 slides through the lug 182. This lug 182 is formed integral with a block 184 which is adjustably secured in position on the face-plate 23 by a T-bolt 185 whose head engages in one of the T-slots 24. The nuts 180 serve to prevent coasting of the slide 25 should wear occur in the parts of the tool shifting mechanism and they prevent backlash due to wear from affecting the amount of shift of the slide.

The principle of operation of the present machine and the principles upon which the process of the present invention is based are illustrated in Figures 7 to 10 inclusive. The cutter 38 is adjusted initially by adjustment of the slide 25 on the cradle and of the plate 28 on the slide 25 to position the cutter in the correct relation for cutting tooth spaces of the desired spiral angle on the blank and the blank P is adjusted to the correct angle and cone distance. Then the machine is put into operation. The cutter rotates in engagement with the blank at the same time feeding into depth. When the cutter has reached full depth, the rolling movement is imparted to the cradle and the cradle rotates in one direction and a rotary movement is simultaneously imparted to the blank through the operation of the segments 102 and 104.

At the end of the roll in one direction, the tool will have cut a tooth slot in the blank, as clearly indicated by the shaded portion 190 in Figure 7, which, at its bottom, is of uniform width throughout its length. Figure 8 shows the form which a roughed pinion P would have if the roughing operation was stopped here. There would be a large amount of stock left on the large ends of the teeth of the roughed pinion which would have to be removed in the finishing operation, for the teeth of such a roughed pinion are disproportionately wide, especially at the large ends, as indicated at 191.

With the present invention, however, at the end of the roll in one direction, the cutter is shifted so that during the return roll in the opposite direction, it cuts in the same tooth space but from a different center. To secure the desired taper in width of the tooth slot from end to end, the cutter is shifted so that its center moves in a direction substantially parallel to the direction of the tooth slot at its small end. Figure 9 shows in dotted lines the position of the cutter corresponding to Figure 7 and in full lines the position it occupies after shifting. Its center is moved from 192 to 193 along a line 194 which is substantially parallel to the direction of the tooth slot at its small end. The desired direction of movement of the cutter is secured by adjustment of the cradle with reference to the crown gear segment 102, in setting-up the machine initially, by rotating the shaft 98 which carries the worm 99 that engages with the worm-wheel segment 100.

The shaded portion 195 in Figure 9 indicates the path of the tip of the blade of the cutter when cutting from the center 193. It will be seen that this path overlaps the portion 190 cut by the tool with its center at 192 and while coinciding with the portion 190 at the small end of the tooth causes a gradual widening of the tooth slot from the small end to the large end thereof. Thus a tooth slot of the desired lengthwise taper in width is obtained and a roughed pinion produced on which a uniform amount of stock is left to be removed in the finishing operation. The amount of stock removed from the pinion teeth in the operation of the tool from its second center 193 is indicated by the shaded portion 197 in Figure 10.

At the end of the return roll, the cutter is withdrawn from engagement with the blank, the blank indexed and the cutter shifted back to its initial position. The cycle then begins anew on the next tooth slot of the blank.

The operation of the machine itself will be understood from the preceding description but may be briefly summed up here.

Assuming that the cutter and blank have been positioned in the correct relation as above described, that the cradle has been adjusted relative to the crown gear 102 so that when the cutter is shifted it will move in the desired direction, that the stops 163 and 164 have been adjusted so that the shifting movement takes place at the correct points in the cycle, that the throw of the crank 144 has been adjusted to secure the desired amount of shift as determined by the size and number of teeth to be cut in the blank, and that the nuts 180 have been correctly adjusted to limit the movement of the slide 25, the machine is put in operation. The cutter will be rotated continuously during the operation of the machine from the pulley 42 through the pinion 43 and internal gear 40.

The cutter is first fed into depth, the feed movement being controlled by the cam 110 and follower 111, the follower being rotated from the shaft 71 (Fig. 3) through the gearing 124, 125, the shaft 126, the worm 122 and the worm-wheel 113 (Figs. 1 and 2). Then, the cradle begins to rotate, rolling in one direction or the other under actuation of the cam 78 and connecting rod 86, the cam being driven from the pulley shaft 44 through the gears 60, 61, the shaft 62, the gears 63, 64, the shaft 65, the gears 66, 67, the shaft 68, the gears 69, 70, the shaft 71, the gears 72, 73, the shaft 74, the worm 75 and the worm-wheel 76 (Figures 1, 2 and 3).

As the cradle rotates, it imparts a corresponding rotary movement to the sleeve 47, in which the work spindle 46 is mounted, through the crown gear segment 102 and the gear segment 104.

Assuming that the initial direction of movement of the cradle is upwardly, near the end of the up-roll the keeper 158 will strike the stop 164 (Figs. 1, 4 and 5), causing the arm 170 of the keeper to be disengaged from the shoulder 157 of the strap 155, thus releasing the slide 25 from the cradle. In the continued roll of the cradle, the stop 164 rocks the arm 149, rocking the crankplate 144 to the left from the position shown in Figures 1 and 4, shifting the arm 138, the cutter slide 25 and the cutter to the right, and moving the center of the cutter from the position 192 to the position 193 (Fig. 9). Then the arm 171 of the keeper is rocked into engagement with the shoulder 156 of the strap 155.

The direction of the cradle movement is then reversed by the cam 78. The cradle rolls down with the cutter cutting in the same tooth slot as before but from the center 193.

When the roughing of the tooth slot is completed, the cutter is withdrawn by the cam 110 to clear the blank. The blank is then indexed relative to the sleeve 47 by operation of the index mechanism which, as described, may be of any suitable type.

During the time that the indexing is taking place, the keeper 158 strikes the stop 163, disengaging the arm 171 of the keeper from the shoulder 156, moving the arm 149 back to the right, and shifting the slide 25 and the cutter back to its initial position with the center of the cutter once again at 192 and again rocking the arm 170 of the keeper into engagement with the shoulder 157 of the strap 155. Reversal of direction of movement of the cradle then takes place and the cycle begins anew with the cutter operating in a new tooth slot of the blank.

In the manner described, all of the tooth spaces of the blank are cut.

In order to use the present machine for finishing pinions, all that is necessary is to shape the track of the cam 78 so that a sufficient roll is provided to roll out not only the tooth curve but the tooth profile. In a roughing operation, it is usual to provide only sufficient roll to roll out the lengthwise tooth curve.

As above stated, the present invention is not limited to the cutting of pinions, as it may be employed equally as well in the roughing or finishing of gears and with or without a rolling motion.

In general, it may be said that while the invention has been described in connection with a particular embodiment and a particular use for that embodiment, it will be understood that the invention is capable of various further modifications and that the features of the invention are capable of various further uses. This application is intended to cover any adaptations, uses, or embodiments of the present invention following, in general, the principles of the invention and including such departures from the present disclosure as come within known or customary practice in the gear art and as may be applied to the essential features hereinbefore set forth and as fall within the scope of the invention or the limits of the appended claims.

Having thus described my invention, what I claim is:

1. In a machine for producing longitudinally curved tooth gears, a tool mechanism, means for imparting a cutting motion to the tool mechanism, a work support, means for producing a relative rolling motion between the tool mechanism and the work support, means whereby the relative rolling motion operates to shift the tool mechanism, after one side of a tooth space of the blank has been cut, to cause the opposite side to be cut from a different center and operates to return the tool mechanism to initial position after the tooth space has been finished, and means for indexing the blank after each tooth space has been cut.

2. In a machine for producing longitudinally curved tooth gears, a tool support, a face mill gear cutter journaled in the tool support, means for rotating the cutter, a work support, means for producing a relative oscillatory rolling motion between the tool and work supports, means operated by the rolling motion for shifting the tool support in opposite directions between the roll in opposite directions whereby opposite sides of each tooth space of the blank are cut, respectively, from different centers during the roll in opposite directions, and means for indexing the blank after each tooth space has been cut.

3. In a machine for producing longitudinally curved tooth tapered gears, a tool support, a face mill gear cutter journaled in the tool support, means for rotating the cutter, a work support, means for producing a relative oscillatory rolling motion between the tool and work supports, means for shifting the tool support alternately back and forth in a direction parallel to the general direction of the gear tooth at the small end thereof between the roll in opposite directions whereby opposite sides of each tooth space of the blank are cut, respectively, from different centers during the roll in opposite directions, and means for indexing the blank after each tooth space has been cut.

4. The method of cutting longitudinally curved tooth gears which comprises cutting one side face of a tooth space from one center then shifting the tool in a direction parallel to the direction of the tooth at its small end to cut the opposite side face of the tooth space from a different center, and then returning the cutter to initial position and indexing the blank to bring the next adjacent tooth face into position for cutting.

5. The method of cutting longitudinally curved tooth gears which comprises cutting one side of a tooth space of the blank from one center while the tool and blank are rolling together in one direction, then shifting the tool relative to the blank in a direction substantially parallel to the direction of the tooth at the small end thereof to shift the center of the tool and cutting the opposite side of the tooth space from the latter center while the tool and blank are rolling together in the opposite direction and indexing the blank after each tooth space has been cut.

6. In a machine for producing gears, a slide, a tool mounted on said slide for movement in a longitudinally curved path across the face of a gear blank, means for actuating the tool, means for holding the slide against movement during cutting, means for shifting the slide in opposite directions alternately after cutting of opposite side tooth faces of the blank comprising a crank member having a block and slot connection through the crank-pin with the slide and means for automatically moving the crank in opposite directions alternately after opposite side tooth faces of the blank have been cut, and means for indexing the blank after a pair of tooth faces have been cut.

7. In a machine for producing gears, a slide, a tool mounted on said slide, means for imparting a cutting movement to the tool, a work support, means for producing a relative rolling motion between the tool and the work support, means for securing the slide against movement relative to the last named means, means operable by the relative rolling movement for releasing said securing means and for shifting said slide in opposite directions alternately after the cutting of opposite sides of a tooth space of the blank, and means for indexing the blank after a pair of tooth faces have been cut.

8. In a machine for producing gears, a slide, a tool mounted on the slide for movement in a longitudinally curved path across the face of a gear blank, means for actuating the tool, means for holding the slide against movement during cutting, means for shifting the slide back and forth alternately in a direction parallel to the general direction of a tooth of the blank being cut at the small end thereof after cutting of opposite side tooth faces of the blank, and means for indexing the blank after a pair of tooth faces have been cut.

9. In a machine for producing longitudinally curved tooth gears, a slide, a tool support adjustable on the slide, a work support, means for shifting the slide back and forth comprising a crank member having a block and slot connection through the crank-pin with the slide, means for producing a relative rolling motion between the tool and work supports, means whereby the rolling motion operates at opposite ends of the roll to actuate said crank-member to shift the slide back and forth, respectively, whereby adjacent side tooth faces of the blank are cut from different centers, respectively, during the roll in opposite directions, and means for indexing the blank after each pair of tooth faces has been cut.

10. In a machine for producing gears, a slide, a face mill cutter rotatably mounted on the slide, a work support, a cradle on which the slide is mounted, a frame in which the cradle is rotatably mounted, means for imparting an oscillatory movement to the cradle, a crank member mounted on the cradle and having a block and slot connection through its crank-pin with the slide, and means mounted on the frame adapted to actuate the crank in opposite directions at opposite ends of the cradle movement to shift the slide back and forth, respectively, at opposite ends of the roll, whereby adjacent side tooth faces of the blank are cut from different centers, respectively, during the roll in opposite directions, and means for indexing the blank after each pair of tooth faces has been cut.

11. In a machine for producing gears, a cradle, a frame in which the cradle is journaled, a slide movable on the cradle, means for oscillating the cradle, a face mill cutter rotatably mounted on the slide, means for securing the slide to the cradle during cutting, and means operated by the relative movement between the cradle and the frame for disengaging the securing means at each end of the oscillatory movement of the cradle and thereafter moving the slide on the cradle, said movements being in opposite directions but of equal extent at the two ends of the cradle movement.

12. In a machine for producing gears, a frame, a cradle journaled in the frame, a slide mounted on the cradle, a face mill cutter rotatably mounted on the slide, means for oscillating the cradle, and means for shifting the slide to move the cutter in opposite directions comprising a crank operatively connected with the slide, an arm connected to the crank, and a pair of stops adjustably secured to the frame for actuating the crank-arm in opposite directions, respectively, at opposite ends of the roll of the cradle.

13. In a machine for producing gears, a frame, a cradle journaled in the frame, a slide mounted on the cradle, a face mill cutter rotatably mounted on the slide, means for oscillating the cradle, a crank operatively connected with the slide, an arm connected to the crank, a double-ended catch pivotally mounted on the crank arm, opposite ends of which engage the slide during movement of the cradle in opposite directions to prevent movement of the slide relative to the cradle during cutting, and a pair of stops adjustably mounted on the frame adapted, respectively, at opposite ends of the movement of the cradle to first disengage the catch from the slide and then rotate the crank-arm to shift the slide on the cradle, whereby the cutter is positioned to cut opposite side faces of each tooth space of the blank, respectively, from different centers during the roll of the cradle in opposite directions, and means for indexing the blank after each tooth space has been cut.

MAXWELL H. HILL.